(12) United States Patent
Choi et al.

(10) Patent No.: US 11,640,504 B2
(45) Date of Patent: May 2, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Hyungtak Choi, Suwon-si (KR); Lohit Ravuru, Suwon-si (KR); Seonghan Ryu, Suwon-si (KR); Donghyeon Lee, Suwon-si (KR); Hojung Lee, Suwon-si (KR); Seungsoo Kang, Suwon-si (KR); Jongsun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 16/874,855

(22) Filed: May 15, 2020

(65) Prior Publication Data

US 2020/0364403 A1 Nov. 19, 2020

(30) Foreign Application Priority Data

May 17, 2019 (KR) .......................... 10-2019-0058330
Apr. 22, 2020 (KR) .......................... 10-2020-0048452

(51) Int. Cl.
*G06F 40/284* (2020.01)
*G06F 21/60* (2013.01)

(52) U.S. Cl.
CPC .......... *G06F 40/284* (2020.01); *G06F 21/606* (2013.01)

(58) Field of Classification Search
CPC ...... G06F 40/284; G06F 21/606; G06F 40/20; G06F 16/345; G06F 21/6254; H04L 63/04

USPC ............................................................ 704/9
See application file for complete search history.

(56) References Cited

U.S. PATENT DOCUMENTS

| 5,228,117 A | 7/1993 | Fukui et al. |
| 5,359,701 A | 10/1994 | Fukui et al. |
| 5,506,938 A | 4/1996 | Fukui et al. |
| 5,638,543 A | 6/1997 | Pedersen et al. |
| 5,721,910 A | 2/1998 | Unger et al. |
| 5,835,922 A | 11/1998 | Shima et al. |
| 5,870,746 A | 2/1999 | Knutson et al. |

(Continued)

FOREIGN PATENT DOCUMENTS

| EP | 3062238 | 8/2016 |
| KR | 10-2009-0083747 | 8/2009 |

(Continued)

OTHER PUBLICATIONS

European Search Report and Written Opinion dated Oct. 12, 2020 in corresponding European Application No. 20174888.6.

*Primary Examiner* — Thierry L Pham
(74) *Attorney, Agent, or Firm* — Nixon & Vanderhye P.C.

(57) ABSTRACT

An electronic apparatus and a controlling method thereof are provided. The method of controlling an electronic apparatus according to an embodiment includes: obtaining first text information including a plurality of words, identifying a security level of the first text information based on at least one of a source from which the first text information is obtained or a type of the first text information, obtaining second text information by converting at least one of the plurality of words included in the first text information based on the identified security level, and obtaining first summary sentence information summarizing the second text information through a summary module.

17 Claims, 10 Drawing Sheets

(56) References Cited

U.S. PATENT DOCUMENTS

| | | |
|---|---|---|
| 6,029,175 A | 2/2000 | Chow et al. |
| 6,185,592 B1 | 2/2001 | Boguraev et al. |
| 6,271,840 B1 | 8/2001 | Finseth et al. |
| 6,359,633 B1 | 3/2002 | Balasubramaniam et al. |
| 6,490,567 B1 | 12/2002 | Gregory |
| 6,513,145 B1 | 1/2003 | Venkitakrishnan |
| 6,581,038 B1 | 6/2003 | Mahran |
| 6,581,057 B1 | 6/2003 | Witbrock et al. |
| 6,772,396 B1 | 8/2004 | Cronin et al. |
| 6,839,681 B1 | 1/2005 | Hotz |
| 6,857,102 B1 | 2/2005 | Bickmore et al. |
| 6,915,239 B2 | 7/2005 | Bergman et al. |
| 7,003,441 B2 | 2/2006 | Venkitakrishnan |
| 7,039,953 B2 | 5/2006 | Black et al. |
| 7,065,514 B2 | 6/2006 | Yang-Stephens et al. |
| 7,080,392 B1 | 7/2006 | Geshwind |
| 7,137,126 B1 | 11/2006 | Coffman et al. |
| 7,171,406 B2 | 1/2007 | Chen et al. |
| 7,181,422 B1 | 2/2007 | Philip et al. |
| 7,185,276 B2 | 2/2007 | Keswa |
| 7,263,512 B2 | 8/2007 | McGoveran |
| 7,278,160 B2 | 10/2007 | Black et al. |
| 7,292,956 B1 | 11/2007 | Guday et al. |
| 7,333,984 B2 | 2/2008 | Oosta |
| 7,334,186 B2 | 2/2008 | Wu |
| 7,430,504 B2 | 9/2008 | Vanderwende et al. |
| 7,448,059 B1 | 11/2008 | Maetz et al. |
| 7,475,121 B2 | 1/2009 | Ushigusa |
| 7,496,861 B2 | 2/2009 | Nation et al. |
| 7,506,001 B2 | 3/2009 | Johnson et al. |
| 7,519,529 B1 | 4/2009 | Horvitz |
| 7,519,562 B1 | 4/2009 | Vander Mey et al. |
| 7,545,829 B2 | 6/2009 | Shimazaki et al. |
| 7,567,955 B2 | 7/2009 | Kraft et al. |
| 7,567,961 B2 | 7/2009 | Yang-Stephens et al. |
| 7,568,151 B2 | 7/2009 | Bargeron et al. |
| 7,571,480 B2 | 8/2009 | Black et al. |
| 7,613,365 B2 | 11/2009 | Wang et al. |
| 7,624,093 B2 | 11/2009 | Fortuna, Jr. |
| 7,650,319 B2 | 1/2010 | Hoffberg et al. |
| 7,665,120 B2 | 2/2010 | Ramanathan et al. |
| 7,693,042 B1 | 4/2010 | Wei |
| 7,693,727 B2 | 4/2010 | Moore |
| 7,716,233 B2 | 5/2010 | Xiong |
| 7,729,916 B2 | 6/2010 | Coffman et al. |
| 7,747,429 B2 | 6/2010 | Cho et al. |
| 7,752,204 B2 | 7/2010 | Kao et al. |
| 7,809,792 B2 | 10/2010 | Hirata et al. |
| 7,831,597 B2 | 11/2010 | Wu et al. |
| 7,904,401 B2 | 3/2011 | Dolby et al. |
| 7,912,932 B2 | 3/2011 | Barnes-Leon et al. |
| 7,944,852 B2 | 5/2011 | Wei |
| 7,962,611 B2 | 6/2011 | Hurley et al. |
| 7,996,441 B2 | 8/2011 | Johnson et al. |
| 8,024,364 B2 | 9/2011 | Dunie et al. |
| 8,041,699 B2 | 10/2011 | Sacco |
| 8,051,446 B1 | 11/2011 | Qian et al. |
| 8,096,811 B2 | 1/2012 | Sumner, II et al. |
| 8,156,448 B2 | 4/2012 | Niyogi et al. |
| 8,160,996 B2 | 4/2012 | Lo et al. |
| 8,223,651 B2 | 7/2012 | Kano |
| 8,266,598 B2 | 9/2012 | Gulwani et al. |
| 8,271,411 B2 | 9/2012 | Kaplan |
| 8,275,305 B2 | 9/2012 | Hutchinson et al. |
| 8,296,297 B2 | 10/2012 | Green et al. |
| 8,301,622 B2 | 10/2012 | Green et al. |
| 8,335,755 B1 | 12/2012 | Bankes |
| 8,336,034 B2 | 12/2012 | Sinha |
| 8,346,587 B2 | 1/2013 | Horvitz |
| 8,355,448 B2 | 1/2013 | Hannuksela et al. |
| 8,467,382 B1 | 6/2013 | Doverspike et al. |
| 8,522,167 B2 | 8/2013 | Zhang et al. |
| 8,538,909 B2 | 9/2013 | Ranganath et al. |
| 8,566,360 B2 | 10/2013 | Chen |
| 8,577,280 B2 | 11/2013 | Hutchinson et al. |
| 8,594,998 B2 | 11/2013 | Litvak et al. |
| 8,600,979 B2 | 12/2013 | Kim et al. |
| 8,630,197 B2 | 1/2014 | Chu et al. |
| 8,650,171 B2 | 2/2014 | Sacco |
| 8,706,710 B2 | 4/2014 | Bird et al. |
| 8,706,761 B1 | 4/2014 | Jung et al. |
| 8,738,572 B2 | 5/2014 | Bird et al. |
| 8,745,606 B2 | 6/2014 | Guo et al. |
| 8,751,305 B2 | 6/2014 | Manoogian, III et al. |
| 8,769,008 B1 | 7/2014 | Young et al. |
| 8,776,013 B2 | 7/2014 | Riehl et al. |
| 8,782,529 B2 | 7/2014 | Grabarnik et al. |
| 8,824,461 B2 | 9/2014 | Doverapike et al. |
| 8,825,732 B2 | 9/2014 | Piernot et al. |
| 8,832,620 B1 | 9/2014 | Fried et al. |
| 8,856,764 B2 | 10/2014 | Pistoia et al. |
| 8,890,681 B2 | 11/2014 | Goetz et al. |
| 8,908,770 B2 | 12/2014 | Hannuksela et al. |
| 8,935,291 B2 | 1/2015 | Chen |
| 8,959,075 B2 | 2/2015 | Bird et al. |
| 8,972,512 B2 | 3/2015 | Mays et al. |
| 8,984,398 B2 | 3/2015 | Kanungo et al. |
| 8,984,493 B2 | 3/2015 | Pistoia et al. |
| 9,122,548 B2 | 9/2015 | Caskey et al. |
| 9,137,127 B2 | 9/2015 | Nowack et al. |
| 9,167,672 B2 | 10/2015 | Engelen et al. |
| 9,204,329 B2 | 12/2015 | Boyle et al. |
| 9,286,381 B2 | 3/2016 | Perl et al. |
| 9,292,601 B2 | 3/2016 | Proctor et al. |
| 9,336,332 B2 | 5/2016 | Davis et al. |
| 9,342,561 B2 | 5/2016 | Jamrog et al. |
| 9,386,079 B2 | 7/2016 | Ramalingam et al. |
| 9,426,177 B2 | 8/2016 | Wang et al. |
| 9,426,411 B2 | 8/2016 | Jung |
| 9,436,577 B2 | 9/2016 | Rabin et al. |
| 9,442,810 B2 | 9/2016 | Jaisinghani |
| 9,560,332 B2 | 1/2017 | Shynar et al. |
| 9,565,301 B2 | 2/2017 | Lee et al. |
| 9,594,810 B2 | 3/2017 | Adibi et al. |
| 9,594,872 B2 | 3/2017 | Masarie, Jr. et al. |
| 9,727,934 B2 | 8/2017 | Hamilton, II et al. |
| 9,743,230 B2 | 8/2017 | Young et al. |
| 9,853,872 B2 | 12/2017 | Nowack et al. |
| 9,911,143 B2 | 3/2018 | Dereszynski et al. |
| 9,959,273 B2 | 5/2018 | Bergman et al. |
| 9,972,356 B2 | 5/2018 | Shynar et al. |
| 10,002,137 B2 | 6/2018 | Goldberg et al. |
| 10,013,404 B2 | 7/2018 | Clark et al. |
| 10,031,646 B2 | 7/2018 | Pearcy et al. |
| 10,061,937 B1 | 8/2018 | Hayashi et al. |
| 10,133,448 B2 | 11/2018 | Kucukcakar |
| 10,176,340 B2 | 1/2019 | Dang et al. |
| 10,181,011 B2 | 1/2019 | Dvorak et al. |
| 10,216,721 B2 | 2/2019 | Simske et al. |
| 10,235,425 B2 | 3/2019 | Malik et al. |
| 10,262,337 B2 | 4/2019 | Nolet et al. |
| 10,268,959 B2 | 4/2019 | Sanchez et al. |
| 2003/0051054 A1 | 3/2003 | Redlich et al. |
| 2016/0241546 A1* | 8/2016 | Arnady .................. H04L 9/06 |
| 2017/0068654 A1 | 3/2017 | Jeong et al. |

FOREIGN PATENT DOCUMENTS

| | | |
|---|---|---|
| KR | 10-1538971 | 7/2015 |
| KR | 10-2016-0120529 | 10/2016 |
| KR | 10-2018-0099180 | 9/2018 |
| KR | 10-1956373 | 3/2019 |

* cited by examiner

ELECTRONIC APPARATUS AND CONTROLLING METHOD THEREOF

CROSS-REFERENCE TO RELATED APPLICATIONS

This application is based on and claims priority under 35 U.S.C. § 119 to Korean Patent Application No. 10-2019-0058330 filed on May 17, 2019, in the Korean Intellectual Property Office, and Korean Patent Application No. 10-2020-0048452 filed on Apr. 22, 2020, in the Korean Intellectual Property Office, the disclosures of which are incorporated by reference herein in their entireties.

BACKGROUND

1. Field

The disclosure relates to an electronic apparatus and a controlling method thereof and for example, to an electronic apparatus capable of summarizing sentences while protecting personal information and a controlling method thereof.

2. Description of Related Art

Recently, a lot of contents are provided. A user cannot check all of these contents one by one due to the large amount of contents. Accordingly, there is a need for the user to check more contents by summarizing text information of the contents.

Lately, various methods for summarizing text information of contents have been developed to check numerous contents more easily and quickly. The recent method of summarizing text information is performed by transmitting text information to an external server as it is and obtaining summary sentence information summarizing the text information from the server.

However, when the text information is transmitted to the external server, there is a risk that confidential information included in the text information would be exposed. Therefore, there is a need for a technology that summarizes text information while protecting confidential information included in the text information.

SUMMARY

Embodiments of the disclosure provide an electronic apparatus for summarizing text information by converting at least one word requiring security, which is included in the text information, and a controlling method thereof.

An electronic apparatus according to an example embodiment includes: a communication interface comprising communication circuitry, a memory including at least one instruction, and a processor connected to the communication and the memory and configured to control the electronic apparatus, and the processor is configured to execute the at least one instruction to: obtain first text information including a plurality of words, identify a security level of the first text information based on at least one of a source from which the first text information is obtained or a type of the first text information, obtain second text information by converting at least one of the plurality of words included in the first text information based on the identified security level, and obtain first summary sentence information summarizing the second text information through a summary module.

A method of controlling an electronic apparatus according to an example embodiment includes: obtaining first text information including a plurality of words, identifying a security level of the first text information based on at least one of a source from which the first text information is obtained or a type of the first text information, obtaining second text information by converting at least one of the plurality of words included in the first text information based on the identified security level, and obtaining first summary sentence information summarizing the second text information through a summary module.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, the present disclosure will be described in greater detail with reference to accompanying drawings.

Figure 1:
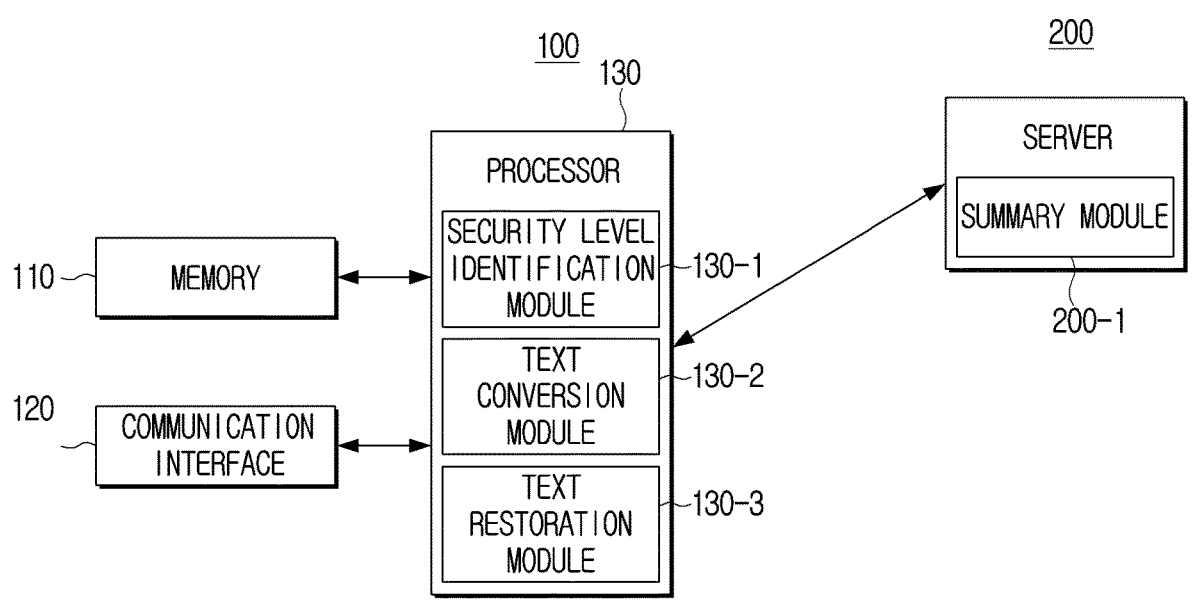
FIG. 1 is a block diagram illustrating an example electronic apparatus and a server according to an embodiment.

FIG. 1 is a block diagram illustrating an example electronic apparatus and a server according to an embodiment.

An electronic apparatus 100 according to an embodiment may include a memory 110, a communication interface (e.g., including communication circuitry) 120 and a processor (e.g., including processing circuitry) 130. The electronic apparatus 100 according to an embodiment may be implemented as various types of electronic apparatus such as, for example, and without limitation, a smartphone, AR glasses, tablet PC, artificial intelligence speaker, mobile phone, video phone, e-book reader, TV, desktop PC, laptop PC, netbook computer, workstation, camera, smart watch, and the like.

The memory 110 may store various programs and data necessary for the operation of the electronic apparatus 100. For example, at least one instruction may be stored in the memory 110. The processor 130 may perform the operation of the electronic apparatus 100 by executing the instruction stored in the memory 110.

The memory 110 may be implemented as a non-volatile memory, a volatile memory, a flash memory, a hard disk drive (HDD) or a solid state drive (SSD). The memory 110 may be accessed by the processor 130 and reading/recording/modifying/deleting/updating of data can be performed by the processor 130. In the present disclosure, the term 'memory' may include the memory 110, a ROM (not illustrated) in the processor 130, a RAM (not illustrated), or a memory card (not illustrated) (e.g., a micro SD card or a memory stick) mounted on the electronic apparatus 100. In addition, when the electronic apparatus 100 includes a display, programs and data for configuring various screens to be displayed on a display area of the display may be stored in the memory 110.

The communication interface 120 may include various communication circuitry and perform communication with a server 200. A communication connection between the communication interface 120 and a server may include communication through a third device (e.g., a repeater, a hub, an access point, a server, a gateway, etc.). The server 200 according to an embodiment may include a summary module (e.g., including processing circuitry and/or executable program elements) 200-1 capable of summarizing text information and generating summary sentence information.

The communication interface 120 may perform communication with the server 200 via wireless communication or wired communication. For example, the wireless communication may include a cellular communication circuit using at least one of LTE, LTE Advance (LTE-A), code division multiple access (CDMA), wideband CDMA (WCDMA), universal mobile telecommunications system (UMTS), Wireless Broadband (WiBro), Global System for Mobile Communication (GSM), etc. According to an embodiment, the wireless communication, for example, may include at least one of wireless fidelity (WiFi), Bluetooth, Bluetooth low power (BLE), Zigbee, near field communication (NFC), Magnetic Secure Transmission, Radio Frequency (RF), body area network (BAN), etc. The wired communication, for example, may include at least one of universal serial bus (USB), high definition multimedia interface (HDMI), recommended standard232 (RS-232), power line communication, plain old telephone service (POTS), etc. A network in which wireless communication or wired communication is performed may include a telecommunication network, for example, at least one of a computer network (e.g., LAN or WAN), Internet or a telephone network.

In addition, the communication interface 120 may transmit second text information in which a word requiring security in first text information is converted to the server 200 and receive second summary sentence information in which the second text information is summarized from the server 200.

The processor 130 may include various processing circuitry and be electrically connected to the memory 110 and control the overall operations and functions of the electronic apparatus 100. For example, the processor 130 may provide a text summary function for providing a summary sentence by converting at least one word requiring security, included in the first text information. According to an embodiment, as illustrated in FIG. 1, the text summary function can be implemented through a plurality of modules included in the processor 130 and a summary module 200-1 included in the server 200, but the present disclosure is not limited thereto. In other words, for example, the text summary function can be implemented without going through the server 200 in the electronic apparatus 100.

The text summary function, as illustrated in FIG. 1, may be implemented through a security level identification module (e.g., including processing circuitry and/or executable program elements) 130-1, a text conversion module (e.g., including processing circuitry and/or executable program elements) 130-2, a text restoration module (e.g., including processing circuitry and/or executable program elements) 130-3 included in the processor 130 of the electronic apparatus 100, and the summary module 200-1 included in the server 200. Each of the plurality of modules can be implemented as software, but is not limited thereto. Some modules can be implemented as combination of hardware and software. According to another embodiment, the plurality of modules can be implemented as one software.

The processor 130 may obtain first text information including a plurality of words. For example, the first text information may include one sentence including a plurality of words, but is not limited thereto. The first text information may include a plurality of sentences. According to an embodiment, the processor 130 may obtain the first text information through at least one application. For example, the processor 130 may obtain the first text information including information regarding news through an Internet application or a news application. In addition, the processor 130 may obtain the first text information including message information through a message application. Further, the processor 130 may obtain the first text information including mail information received from a mail account of a user of the electronic apparatus 100 through a mail application.

The security level identification module 130-1 may identify a security level of the first text information based on at least one of a source from which the first text information is obtained or a type of the first text information. The security level according to an embodiment may include, for example, level for indicating the degree to which words included in the first text information require security. For example, according to the security level of the first text information, the level of conversion regarding at least one word included in the first text information may change. In an example embodiment, the security level may be divided into a first security level where the security level is 'low', a second security level where the security level is 'middle', and a third security level where the security level is 'high.' For example, the first text information identified to have the first security level may have a relatively low degree of security required, and the first text information identified to have the second security level may have a relatively high degree of security required.

According to an embodiment, the security level identification module 130-1 may identify a security level of the first text information according to a source from which the first text information is obtained. For example, the security level identification module 130-1 may identify the security level of the first text information according to the type of application from which the first text information is obtained. In other words, the first text information obtained from an Internet application or a news application may have relatively little information that requires security and thus, the security level identification module 130-1 may identify the security level of the first text information obtained from an application or a news application as the first security level. The first text information obtained from a message application may have a relatively large amount of information that requires security and thus, the security level identification module 130-1 may identify the security level of the first text information obtained from a message application as the third security level. In the above example, the source from which the first text information is obtained is classified according to the type of applications, but the present disclosure is not limited thereto. The security level of the first text information may be identified according to various paths in which the first text information can be obtained.

According to an embodiment, the security level identification module 130-1 may identify the security level of the first text information according to the type of the first text information. For example, the security level identification module 130-1 may identify the security level of the first text information according to the identified type of the first text information. For example, the security level identification module 130-1 may divide the type the first text information into a first type including weather and news information, a second type including a user's message and mail information, a third type including information necessary for the user's business and security, and a fourth type including the user's personal information. In addition, the security level identification module 130-1 may identify the first text information regarding the third type and the fourth type as the third security level, the first text information regarding the second type as the second security level, and the first text information regarding the first type as the first security level. In the above example, the type of the first text information is divided into four types, but is not limited thereto. The security level identification module 130-1 may classify the first text information into more detailed types. In addition, in the above example, the security level is divided into three levels, but is not limited thereto. The security level identification module 130-1 may classify the security level into more detailed levels to identify the security level of the first text information.

Once the security level of the first text information is identified through the security level identification module 130-1, the text conversion module 130-2 may obtain second text information by converting at least one word from among a plurality of words included in the first text information based on the identified security level. In other words, the text conversion module 130-2 according to an embodiment is a module for converting words requiring security, included in the first text information, according to the identified security level.

For example, the text conversion module 130-2 may identify at least one word requiring security from among the plurality of words included in the first text information, and obtain the second text information by converting the corresponding word requiring security based on the type and sensitivity of the identified at least one word.

According to an embodiment, the text conversion module 130-2 may identify at least one word requiring security from among the plurality of words included in the first text information. For example, the text conversion module 130-2 may identify a word including personal information from among the plurality of words included in the first text information and identify the corresponding word as a word requiring security. According to an embodiment, the personal information may include telephone number, name, gender, family relation, and social security number. According to another embodiment, the text conversion module 130-2 may identify a word including information requiring security for the user's business reasons from among the plurality of words included in the first text information and identify the corresponding word as a word requiring security.

According to an embodiment, the text conversion module 130-2 may be implemented as an artificial intelligence module (e.g., including processing circuitry and/or executable program elements). In this case, the text conversion module 130-2 may be trained for the user of the electronic apparatus 100 to identify a word requiring security for the user of the electronic apparatus 100 in the first text information. Details of the case in which each module is implemented as an artificial intelligence model will be described in greater detail below.

According to an embodiment, the text conversion module 130-2 may identify the type of each of at least one word requiring identified security. In addition, according to an embodiment, the text conversion module 130-2 may identify the sensitivity of at least one word requiring identified security. The sensitivity according to an embodiment may be an indicator representing the specific degree of security information included in a word. For example, the word 'Mar. 11, 1999' may have higher sensitivity than the word '90s.'

In addition, the text conversion module 130-2 may convert the identified at least one word by masking the identified word, replacing the word with another word or omitting at least one word based on the identified type and sensitivity.

In other words, according to an embodiment, the text conversion module 130-2 may obtain the second text information by masking at least one word requiring identified security. In addition, according to an embodiment, the text conversion module 130-2 may obtain the second text information by replacing at least one word requiring identified security with another word or omitting at least one word. The various methods of converting at least one word requiring security will be described in greater detail below with reference to FIGS. 5 and 6.

The processor 130 may obtain first summary sentence information summarizing the second text information obtained through the text conversion module 130-2 through a summary module. The first summary sentence information according to an embodiment may include, for example, summary sentence information in which a word requiring security, included in the first text information, is converted and summarized. In other words, the first summary sentence information may be summary sentence information that summarizes the second text information in which at least one word requiring security in the first text information is converted.

According to an embodiment, the processor 130 may transmit the second text information to the server 200 in which the summary module 200-1 is stored and receive the first summary sentence information from the server 200 through the communication interface 120.

In the above example, it is described that the second text information is summarized and the first summary sentence is obtained through the server 200, but the present disclosure is not limited thereto. In other words, the processor 130 may further include a summary module for summarizing the second text information, and may summarize the text information and obtain the first summary sentence information through the corresponding summary module. An example embodiment in which the first summary sentence is generated in the electronic apparatus 100 will be described in greater detail below with reference to FIGS. 7 and 8.

Once the first summary sentence is obtained, the text restoration module 130-3 may obtain the second summary sentence information in which a converted text included in the first summary sentence information is restored. The second summary sentence information may include, for example, summary sentence information summarizing the first text information in which a word requiring security is not converted. In other words, the first summary sentence information may include at least one converted text included in the second text information, and the second summary sentence information may include a restored text of a converted text included in the first summary sentence information.

According to an embodiment, the text conversion module 130-2 may obtain the second text information including a second word by obtaining the second word in which a first word from among the plurality of words included in the first text information is converted. In addition, the processor 130 may obtain the first summary sentence summarizing the second text information from the server 200, and the first summary sentence may include the second word. Further, the text restoration module 130-3 may obtain the first word by restoring the second word included in the first summary sentence information, and obtain the second summary sentence information including the first word. In other words, the above example relates to an example embodiment of obtaining the second summary sentence information in which the first word included in the first text information is included as it is.

According to another embodiment, the processor 130 may transmit the second text information including a first converted word to the server 200, and receive a first summary sentence including a second converted word obtained based on the first converted word from the server 200. In addition, the text restoration module 130-3 may restore the second converted word included in the first summary sentence and obtain a word corresponding to the first converted word. Further, the text restoration module 130-3 may obtain second summary sentence information including the corresponding word. In other words, the above embodiment relates to an example embodiment of obtaining the second summary sentence information in which at least one word requiring security, included in the first text information, is replaced with another text through a summary module.

The above-described modules can be implemented as an artificial intelligence module (e.g., including processing circuitry and/or executable program elements). When each of the security level identification module 130-1, the text conversion module 130-2, the text restoration module 130-3, and the summary module 200-1 is implemented as an artificial intelligence module, each artificial intelligence model can be trained and the performance of the artificial intelligence model can be enhanced.

According to an embodiment, first learning can be performed for each module so that the difference between the second summary sentence information obtained through the security level identification module 130-1, the text conversion module 130-2, the text restoration module 130-3, and the summary module 200-1 and correct answer summary sentence information regarding the first text information is minimized and/or reduced. According to an embodiment, the correct answer summary sentence may be summary sentence information in which the first text information is summarized directly by a user. In other words, the first learning for the security level identification module 130-1, the text conversion module 130-2, the text restoration module 130-3, and the summary module 200-1 according to an embodiment can be performed so that the difference between the summary sentence information summarized directly by the user and the second summary sentence information is compared and minimized and/or reduced.

According to another embodiment, second learning for the security level identification module 130-1, the text conversion module 130-2, the text restoration module 130-3, and the summary module 200-1 according to an embodiment can be performed so that the difference between at least one word converted through the text conversion module 130-2 in the first text information and the word before conversion is minimized and/or reduced.

According to yet another embodiment, third learning for the security level identification module 130-1, the text conversion module 130-2, the text restoration module 130-3, and the summary module 200-1 according to an embodiment can be performed so that the number of words converted through the text conversion module 130-2 in the first text information is minimized and/or reduced.

The first learning to the third learning can be performed separately, but the present disclosure is not limited thereto. The first learning, the second learning and the third learning can be performed simultaneously. When the first learning, the second learning and the third learning can be performed simultaneously, the learning can be performed by assigning weights to each learning and adjusting the corresponding weights. For example, if the first learning is L1 and the weight for the first learning is set to w1, the second learning is L2 and the weight for the second learning is set to w2, and the third learning is L3 and the weight for the third learning is set to w3, the entire learning system may be represented as $w1*L1+w2*L2+w3*L3$.

As described above, when the first learning, the second learning and the third learning may be performed simultaneously, for example, if the first text information is text information regarding a news article, there is no need for minimizing and/or reducing the number of words converted from the first text information and thus, the learning can be performed by lowering w3 to reduce the weight for the third learning (L3) and increasing the weight for the first learning (L1) and the second learning (L2). According to another embodiment, if the first text information is text information including a large amount of personal information, the learning can be performed by increasing w3 to increase the weight for the third learning (L3).

The functions related to artificial intelligence according to an embodiment may be performed through the processor 130 and the memory 110. The processor 130 may include, for example, one or a plurality of processors. In this case, one or a plurality of processors may include, for example, and without limitation, a general-purpose processor such as a CPU, an AP, a Digital Single Processor (DSP), a processor dedicated for graphics such as a GPU, a Vision Processing Unit (VPU), a processor dedicated for artificial intelligence such as an NPU, or the like. One or a plurality of processors control to process input data according to a predefined operation rules stored in a memory or an artificial intelligence model. If one or a plurality of processors are processors dedicated for artificial intelligence, the processors dedicated for artificial intelligence can be designed in a hardware structure specialized for processing a specific artificial intelligence model.

The predefined operation rules and artificial intelligence model are characterized by being created through learning. Being created through learning may refer, for example, to the predefined operation rules or artificial intelligence model being set to perform a desired characteristic (or purpose) as the basic intelligence model is trained using a plurality of training data by a learning algorithm. Such learning may be performed in a device itself in which artificial intelligence according to an embodiment is conducted or may be performed through a separate server/or system. Examples of the learning algorithm include, without limitation, supervised learning, unsupervised learning, semi-supervised learning or reinforcement learning, but are not limited thereto.

The artificial intelligence may include a plurality of neural network layers. Each of the plurality of neural network layers may include a plurality of weights, and may perform a neural network operation through calculation results of the previous layers and calculation between the plurality of weights. The plurality of weights of the plurality of neural network layers can be optimized and/or improved by learning results of the artificial intelligence model. For example, the plurality of weights may be updated so that a loss value or a cost value obtained from the artificial intelligence model during the learning process is reduced or minimized. The artificial intelligence neural network may include a Deep Neural Network (DNN), and for example, may include, without limitation, a Convolutional Neural Network (CNN), a Deep Neural Network (DNN), a Recurrent Neural Network (RNN), a Restricted Boltzmann Machine (RBM), a Deep Belief Network (DBN), a Bidirectional Recurrent Deep Neural Network (BRDNN), a Deep Q-Networks, etc. but is not limited thereto.

The above-described various example embodiments, the electronic apparatus may protect personal information included in text information by converting a word requiring security, included in the text information, to summarize the text information.

Figure 2:
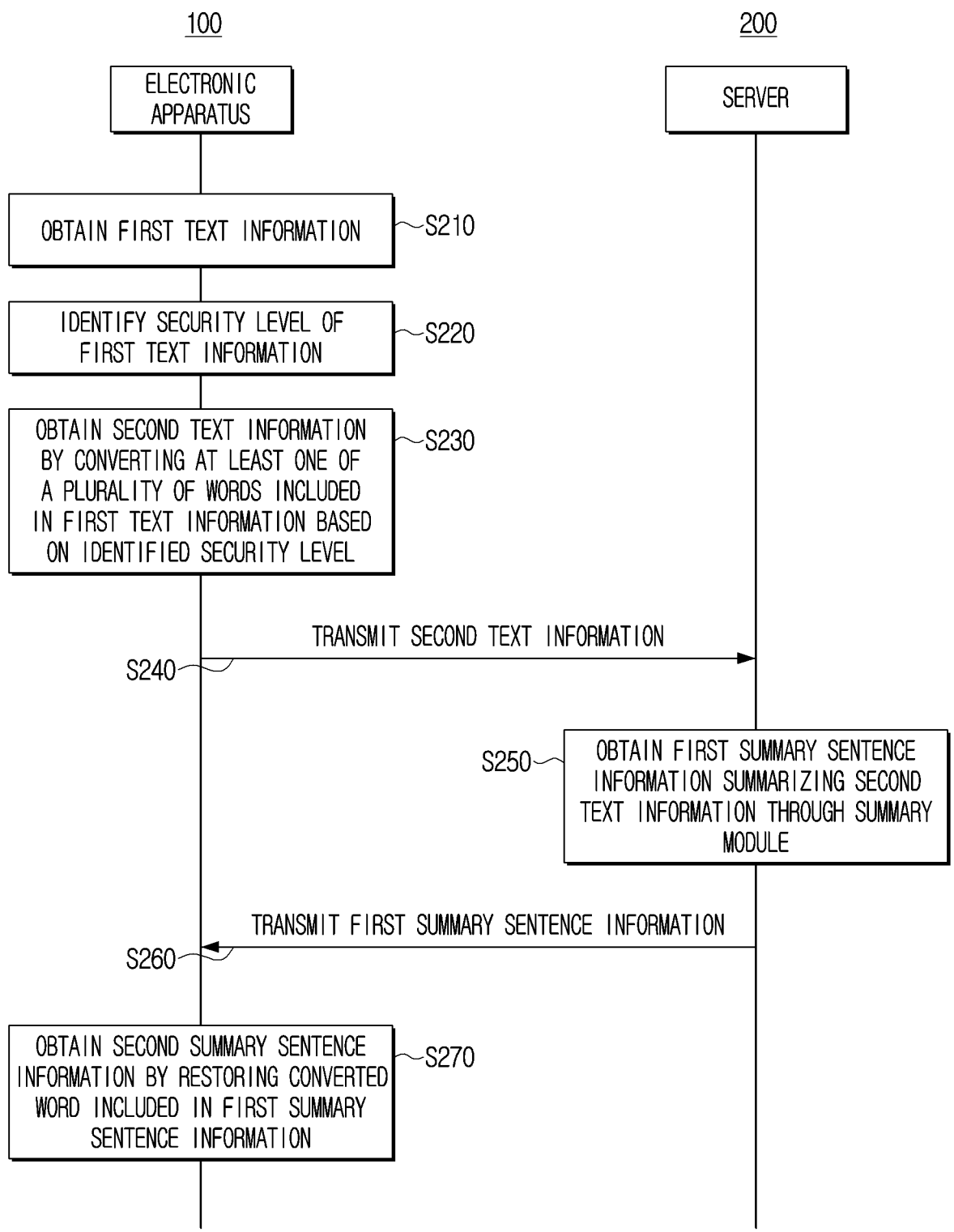
FIG. 2 is a flow diagram illustrating example operations of an electronic apparatus and a server to obtain summary sentence information regarding first text information according to an embodiment.

FIG. 2 is a sequence flow diagram illustrating example operations of an electronic apparatus and a server to obtain summary sentence information regarding first text information according to an embodiment.

Referring to FIG. 2, the electronic apparatus 100 may obtain first text information (S210). According to an embodiment, the first text information may include at least one sentence including a plurality of words, but is not limited thereto. The first text information may include a plurality of sentences.

The electronic apparatus 100 may identify a security level regarding the first text information (S220). According to an embodiment, the electronic apparatus 100 may identify the security level of the first text information based on at least one of a source from which the first text information is obtained or a type of the first text information. The security level according to an embodiment may be a level for indicating the degree of security required for a word included in the first text information. For example, the electronic apparatus 100 may identify the security level of the first text information according to the type of application from which the first text information is obtained.

Once the security level is identified, the electronic apparatus 100 may obtain second text information by converting at least one of a plurality of words included in the first text information based on the identified security level (S230). According to an embodiment, the electronic apparatus 100 may identify at least one word requiring security from among the plurality of words included in the first text information, and obtain the second text information by converting the corresponding word based on at least one of the type or sensitivity of the identified at least one word. The electronic apparatus 100 may convert the identified at least one word by, for example, and without limitation, masking the identified word, replacing the word with another word, omitting at least one word based on the identified type and sensitivity, etc.

Once the second text information is obtained, the electronic apparatus 100 may transmit the second text information to the server 200 (S240). The server 200 may obtain the first summary sentence information summarizing the second text information through a summary module (S250). The first summary sentence information according to an embodiment is summary sentence information in which a word requiring security, included in the first text information, may be converted and summarized. In other words, the first summary sentence information may be summary sentence information summarizing the second text information in which at least one word in the first text information is converted. The server 200 may transmit the obtained first summary sentence information to the electronic apparatus 100 (S260).

Once the electronic apparatus 100 obtains the first summary sentence information from the server 200, the electronic apparatus 100 may obtain second summary sentence information by restoring the converted word included in the first summary sentence information (S270). The second summary sentence information according to an embodiment may be summary sentence information summarizing the first text information in which a word requiring security is not converted. In other words, the first summary sentence information may include at least one converted text included in the second text information, and the second summary sentence information may include a restored text of a converted text included in the first summary sentence information.

Through the above-described embodiment, information requiring security included in text information to be transmitted to the server 200 is converted and personal information included in the text information can be protected.

Figure 3:
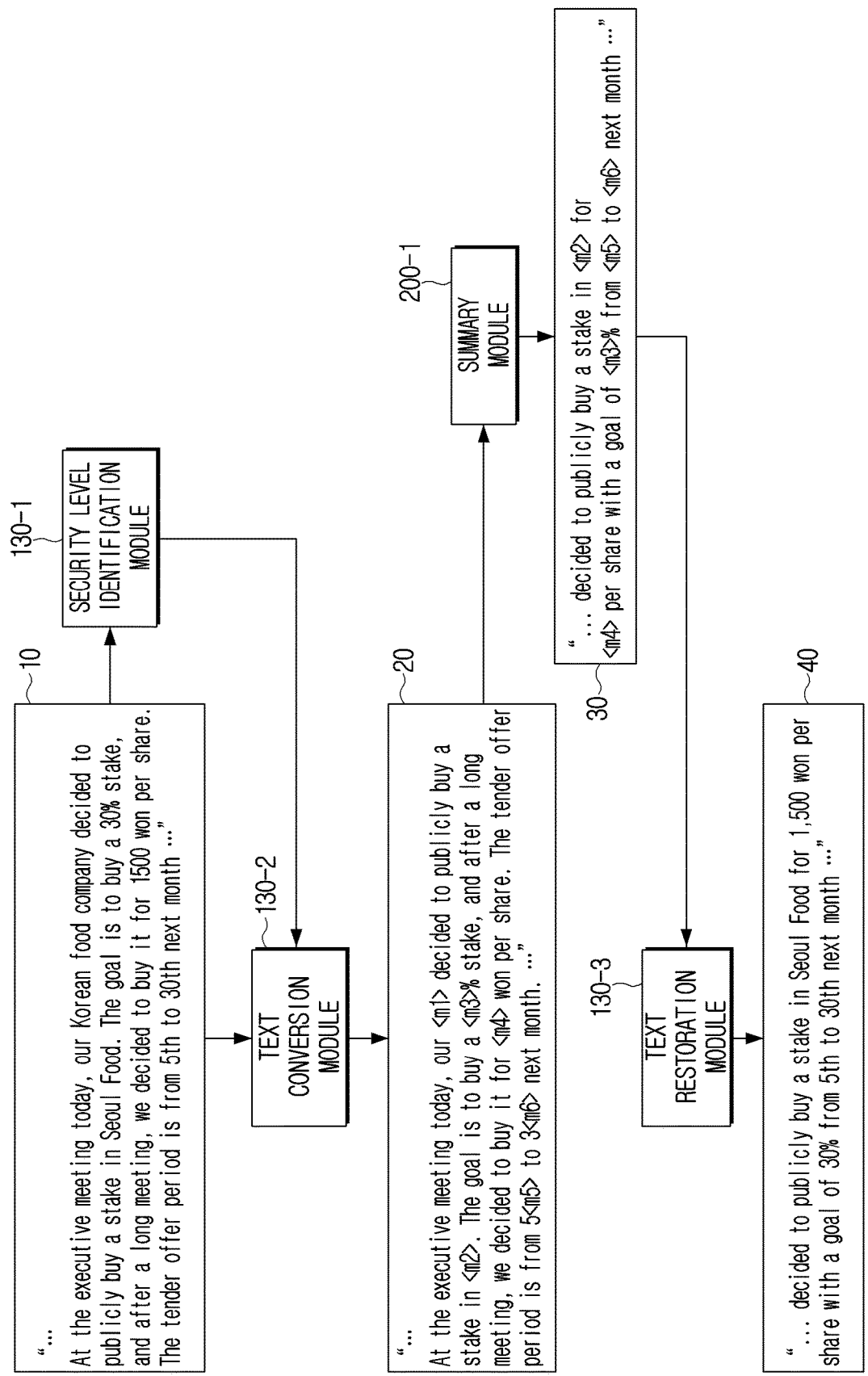
FIG. 3 is a diagram illustrating an example process of obtaining a second summary sentence through first text information according to an embodiment.

FIG. 3 is a diagram illustrating an example process of obtaining a second summary sentence through first text information according to an embodiment.

The electronic apparatus 100 may obtain first text information 10. According to an embodiment, the first text information 10 in FIG. 3 may be text information requiring security for business reasons. Once the first text information 10 is obtained, the electronic apparatus 100 may input the first text information 10 to the security level identification module 130-1 to obtain the security level of the first text information 10. The electronic apparatus 100 may input the first text information 10 and the obtained security level to the text conversion module 130-2 to obtain second text information 20 in which at least one word requiring security in the first text information 10 is converted. FIG. 2 illustrates, by way of non-limiting example, the second text information 20 in which words related to the company name, share ratio, purchase price per week, and public purchase period included in the first text information 10 are converted.

The electronic apparatus 100 may obtain first summary sentence information 30 summarizing the second text information 20 through the summary module 200-1. According to an embodiment, the electronic apparatus 100 may transmit the second text information 20 to the server 200. The server 200 may obtain the first summary sentence information 30 summarizing the second text information 20 through the summary module 200-1, and transmit the first summary sentence information 30 to the electronic apparatus 100. However, the present disclosure is not limited thereto, and when the summary module 200-1 exists in the electronic apparatus 100, the first summary sentence information 30 can be generated in the electronic apparatus 100 without going through the server 200, which will be described in detail in greater detail below with reference to FIGS. 7 and 8.

Once the electronic apparatus 100 obtains the first summary sentence information 30, the electronic apparatus 100 may input the first summary sentence information 30 to the text restoration module 130-3, and obtain second summary sentence information 40 in which a converted word included in the first summary sentence information 30 is restored.

Through the above-described embodiment, words requiring security, included in the first text information 10, are converted and transmitted to the server 200 and thus, personal information included in the first text information 10 can be protected.

Figure 4:
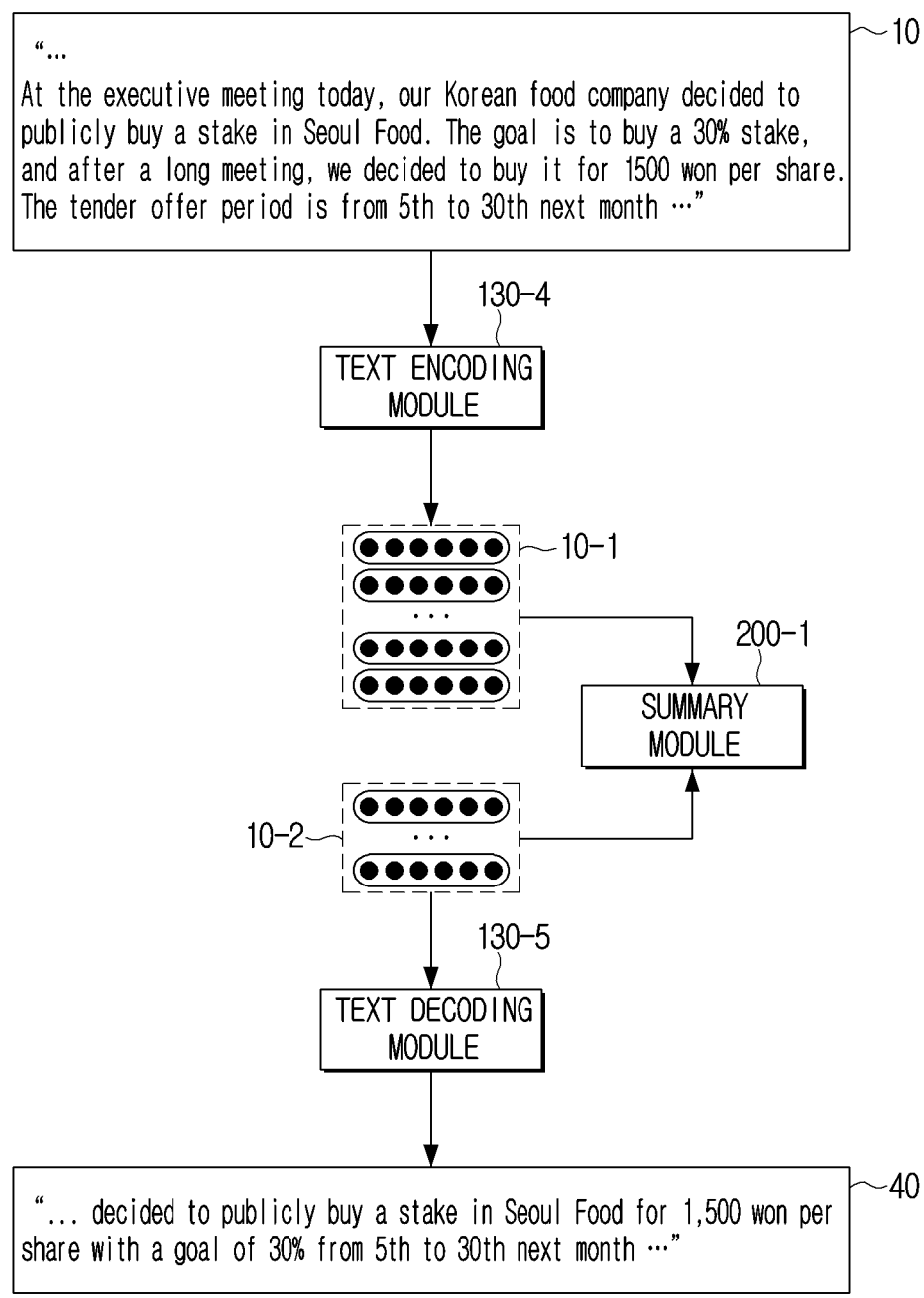
FIG. 4 is a diagram illustrating an example method of converting information requiring security, included in first text information, through a text encoding module according to an embodiment.

FIG. 4 is a diagram illustrating an example method of converting information requiring security, included in first text information, through a text encoding module according to an embodiment.

Referring to FIG. 4, the electronic apparatus 100 may encode the entire first text information 10 without identifying words requiring security in the first text information 10, and transmit the encoded information to the server 200.

In other words, the electronic apparatus 100 may input the first text information to a text encoding module (e.g., including text encoding circuitry) 130-4 to obtain first encoding information 10-1 in which the first text information 10 is encoded. The text encoding module 130-4 according to an embodiment may, for example, be configured to encode the first text information 10 in the form of a numeric vector. If the first text information 10 is encoded in the form of a numeric vector according to an embodiment, personal information included in the first text information 10 can be protected.

The electronic apparatus 100 may transmit the first encoding information 10-1 to the server 200. However, the present disclosure is not limited thereto, and the electronic apparatus 100 may transmit pattern information in which the first encoding information 10-1 is encoded together with the first encoding information 10-1. The pattern information according to an embodiment is information on a pattern in which the first text information 10 is encoded to the first encoding information 10-1, and the meaning of the first encoding information 10-1 can be grasped in the server 200 through the pattern information.

The server 200 may input the first encoding information 10-1 to the summary module 200-1 to obtain second encoding information 10-2 summarizing the first text information 10. According to an embodiment, the summary module 200-1 may obtain the second encoding information 10-2 summarizing the first text information 10 through numeric vectors included in the first encoding information 10-1. The server 200 may transmit the second encoding information 10-2 to the electronic apparatus 100.

The electronic apparatus 100 may input the received second encoding information 10-2 to a text decoding module (e.g., including text decoding circuitry) 130-5 to obtain second summary information 40 summarizing the first text information 10. According to an embodiment the text decoding module 130-5 may decode the second encoding information 10-2 through the pattern information.

In the above-described embodiment, it is described that the text encoding module 130-4 may be configured to encode the first text information 10 in the form of a numeric vector, but the present disclosure is not limited thereto. In other words, the text encoding module 130-4 according to an embodiment may be implemented as an artificial intelligence model using a Style Transfer technology. The Style Transfer technology according to an embodiment is a technology for converting attributes included in the first text information to other attributes. According to an embodiment, the first text information may include attributes such as tense, subject, object, mood, negative expressions, etc.

According to an embodiment, when the text encoding module 130-4 is implemented as an artificial intelligence model using, for example, the Style Transfer technology, the electronic apparatus 100 may obtain the first encoding information 10-1 by converting at least one of the attributes included in the first text information 10 through the text encoding module 130-4. For example, if the mood of the first text information 10 an indicative mood, the text encoding module 130-4 may convert the mood of the first text information 10 from the indicative mood to a subjunctive mood. In addition, if the tense of the first text information 10 is past, the text encoding module 130-4 may convert the tense of the first text information 10 from the past to future.

In addition, according to an embodiment, the number of attributes to be converted may be identified according to the security level of the first text information 10. In other words, if the first text information 10 requires a high level of security, all attributes included in the first text information 10 can be converted. However, if the first text information 10 requires a low level of security, only one of the attributes included in the first text information 10 can be converted.

In addition, the electronic apparatus 100 may transmit the first encoding information 10-1 together with attribute information to the external server 200, and receive the second encoding information 10-2 regarding the first encoding information 10-2 from the external server. The electronic apparatus 100 may obtain the second summary information 40 in which the converted attributes of the first encoding information 10-1 are restored through the text decoding module 130-5 using the second encoding information 10-2.

Through the above-described embodiment, by transmitting information 10-1 in which the first text information is encoded to the server 200, personal information included in the first text information can be protected.

Figure 5:
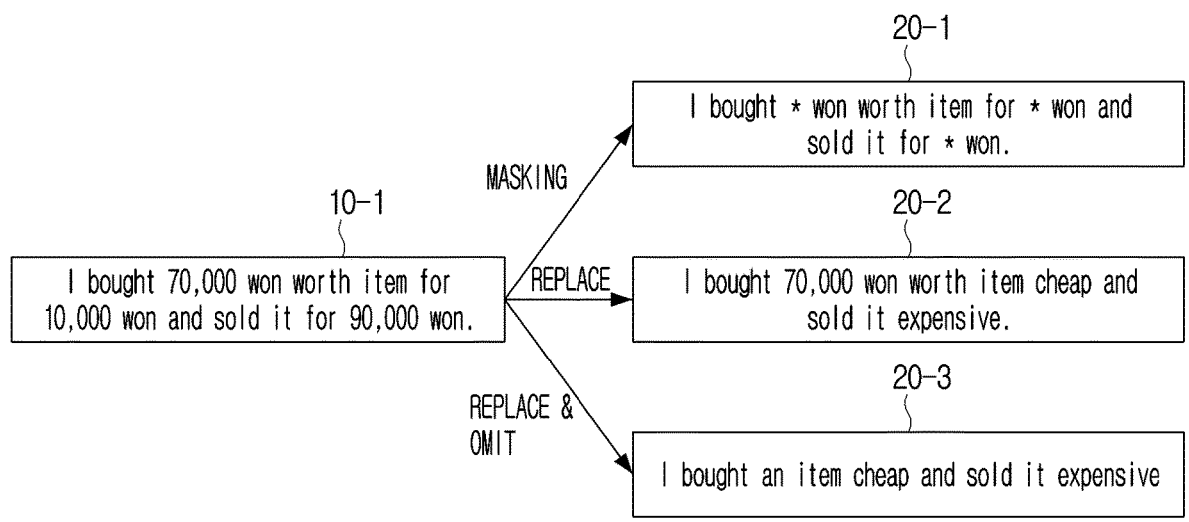
FIG. 5 is a diagram illustrating an example of converting a word requiring security, included in first text information, according to an embodiment.

FIG. 5 is a diagram illustrating an example of converting a word requiring security, included in first text information, according to an embodiment.

According to an embodiment, the electronic apparatus 100 may obtain text information (10-1) of "I bought a 70,000 won worth item for 10,000 won and sold it for 90,000 won." The electronic apparatus 100 may identify a security level of the text information 10-1, and identify at least one word requiring security from among a plurality of words included in the text information 10-1 based on the security level. According to an embodiment, a numeric word from among the words included in the text information 10-1 may be identified as a word requiring security. The electronic apparatus 100 may convert identified words based on at least one of a type or sensitivity of the identified words.

According to an embodiment, the electronic apparatus 100 may obtain text information 20-1 by masking words requiring security, included in the text information 10-1. In other words, the text information 20-1 may be text information in which a numeric word included in the first text information is masked in the form of *. In this case, the electronic apparatus 100 may identify words for which security is required in the text information 10-1 as "7", "1", and "9."

According to an embodiment, the electronic apparatus 100 may obtain text information 20-2 by replacing words requiring security in the text information 10-1 with other words. In other words, the text information 20-2 may be text information in which the word "10,000 won" included in the first text information is converted into "cheap" and the word "90,000 won" included in the first text information is converted into "expensive." In this example, the electronic apparatus 100 may identify that words requiring security in the text information 10-1 are "10,000 won" and "90,000 won."

According to an embodiment, the electronic apparatus 100 may obtain text information 20-3 by replacing at least one word from among words requiring security in the text information 10-1 with another word, and omitting at least one of the words requiring security. In other words, the text information 20-3 may be text information in which the word "70,000 won worth" included in the text information 10-1 is omitted. In addition, it may be text information in which the word "10,000 won" included in the first text information is converted into "cheap" and the word "90,000 won" is converted into "expensive." In this example, the electronic apparatus 100 may identify that words requiring security in the first text information 10-1 are "70,000 won worth", "10,000 won" and "90,000 won."

According to the above-described embodiments, depending on the type and sensitivity of words requiring security in the text information 10-1, the electronic apparatus 100 may convert a plurality of words requiring security in various forms.

Figure 6:
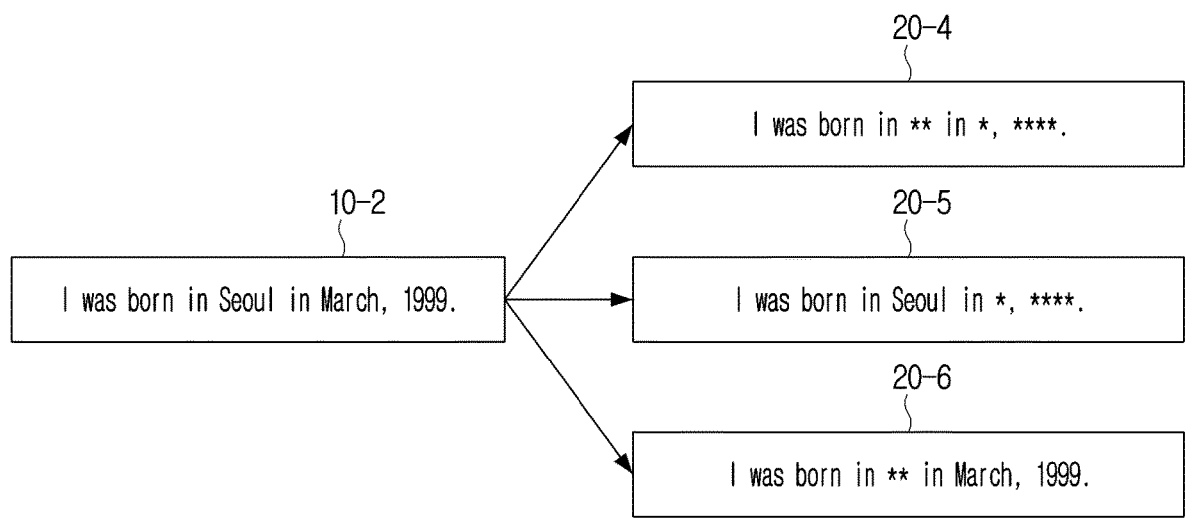
FIG. 6 is a diagram illustrating an example of identifying and converting a word requiring security, included in first text information, according to an embodiment.

FIG. 6 is a diagram illustrating an example of identifying and converting a word requiring security, included in first text information, according to an embodiment.

According to an embodiment, the electronic apparatus 100 may obtain the sentence "born in Seoul in March 1999" as text information 10-2. The electronic apparatus 100 may identify a security level of the text information 10-2, and identify at least one word requiring security from among a plurality of words included in the text information 10-2 based on the security level.

According to an embodiment, the electronic apparatus 100 may identify the security level of the text information 10-2 as a first security level. According to an embodiment, the first security level may be a security level for identify words including information regarding birth year and place as words requiring security. If the security level of the text information 10-2 is identified as the first security level, the electronic apparatus 100 may obtain text information 20-4 such as "born in \*\*, in \*, \*\*\*\*" by converting words including the birth year and place included in the text information 10-2.

According to an embodiment, the electronic apparatus 100 may identify the security level of the text information 10-2 as a second security level. According to an embodiment, the second security level may be a security level for identifying words including information regarding the birth year as words requiring security. If the security level of the text information 10-2 is identified as the second security level, the electronic apparatus 100 may obtain text information 20-5 such as "born in Seoul in \*, \*\*\*\*" by converting words including the birth year in the text information 10-2.

According to an embodiment, the electronic apparatus 100 may identify the security level of the text information 10-2 as a third security level. According to an embodiment, the third security level may be a security level for identifying words including the place as words for requiring security. If the security level of the text information 10-2 is identified as the third security level, the electronic apparatus 100 may obtain text information 20-6 such as "born in \*\* in March 1999" by converting words including information regarding the place in the text information 10-2.

In the above-described embodiments, it is described that words requiring security are masked and converted into \*\* words, but the present disclosure is not limited thereto. In other words, as illustrated in FIG. 5, words requiring security may be replaced with other words, or at least one of the words requiring security may be omitted.

Figure 7:
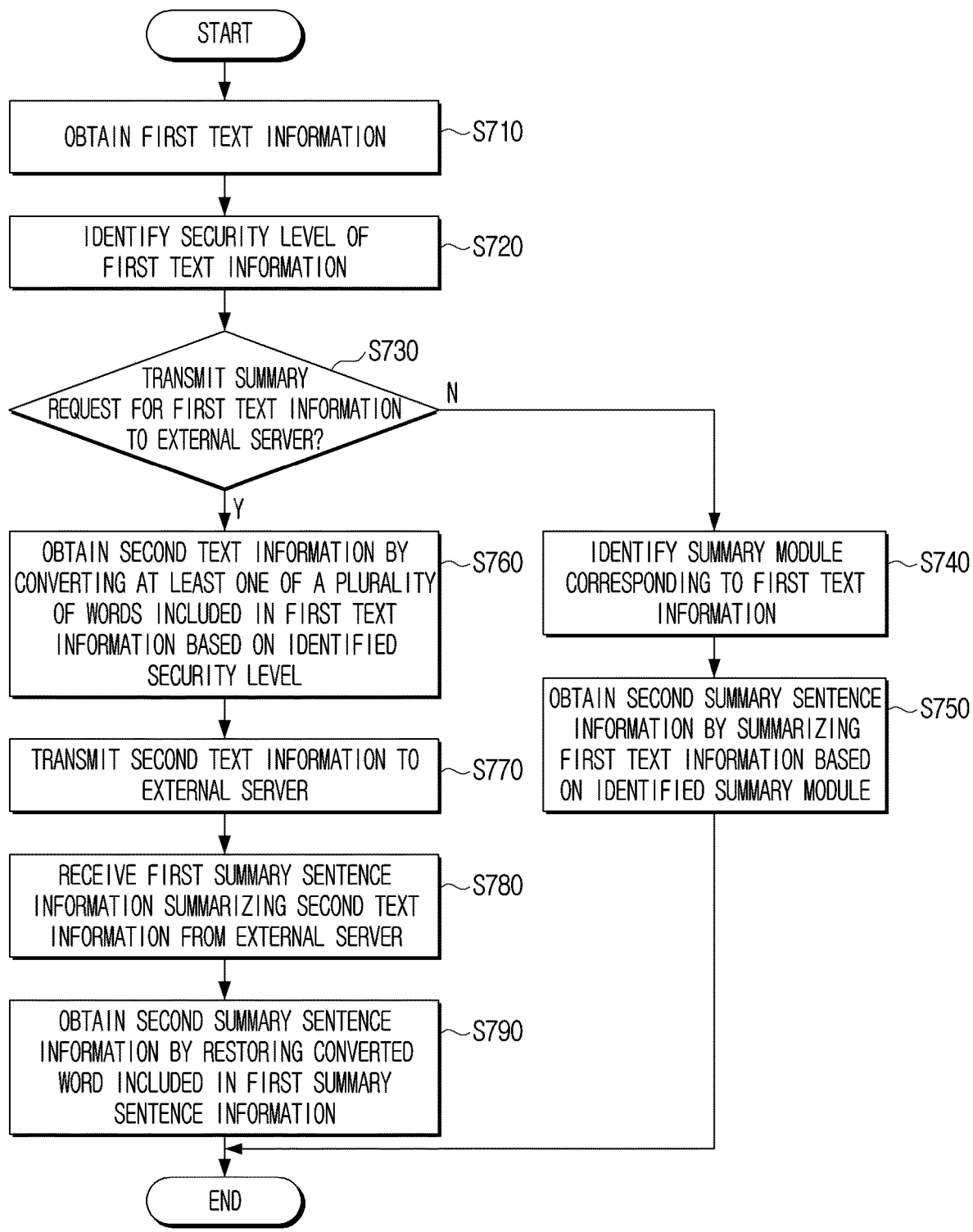
FIG. 7 is a flowchart illustrating an example method of controlling an electronic apparatus depending on whether to transmit a summary request for first text information to a server according to an embodiment.

FIG. 7 is a flowchart illustrating an example method of an electronic apparatus depending on whether to transmit a summary request for first text information to a server according to an embodiment.

According to an embodiment, the electronic apparatus 100 may identify whether to transmit a summary request for the first text information to an external server. In other words, according to an embodiment, if it is identified that a summary request for the first text information is not transmitted to an external server, the electronic apparatus 100 may summarize the first text information through a summary module in the electronic apparatus 100.

Referring to FIG. 7, the electronic apparatus 100 may obtain the first text information (S710). The electronic apparatus 100 may identify a security level of the first text information (S720).

Once the security level of the first text information is identified, the electronic apparatus 100 may identify whether to transmit a summary request for the first text information to the external server 200 (S730). According to an embodiment, the electronic apparatus 100 may identify whether to transmit a summary request for the first text information to the external server 200 according to the security level of the first text information. In other words, if it is identified that the security level of the first text information requires a high level of security, the electronic apparatus 100 may not transmit a summary request for the first text information to the external server. According to an embodiment, if the first text information is text information obtained through a message application, the security level of the first text information may be identified as a security level requiring a high level of security.

If it is identified that a summary request for the first text information is not transmitted to the external server 200 (S730-N), the electronic apparatus 100 may identify a summary module corresponding to the first text information (S740). According to an embodiment, at least summary module for summarizing the first text information may be pre-stored in the electronic apparatus 100. For example, a first summary module for summarizing text information related to sports and a second summary module for summarizing text information related to messages may be pre-stored in the electronic apparatus 100. In other words, the electronic apparatus 100 may identify a summary module corresponding to the first text information according to the type of the first text information.

Once a summary module corresponding to the first text information is identified, the electronic apparatus 100 may obtain second summary sentence information by summarizing the first text information based on the identified summary module (S750). In other words, according to an embodiment, if the first text information is summarized in the electronic apparatus 100 without going through the server 200, the second summary sentence regarding the first text information may be obtained without converting words requiring security, included in the first text information.

If it is identified that a summary request for the first text information is transmitted to the external server 200 (S730-Y), the electronic apparatus 100 may obtain second text information by converting at least one of a plurality of words included in the first text information based on the identified security level (S760). According to an embodiment, the converted word may be a word including information which requires security.

Once the second text information is obtained, the electronic apparatus 100 may transmit the second text information to the external server 200 (S770). The electronic apparatus 100 may receive first summary sentence information summarizing the second text information from the external server 200 (S780).

Once the first summary sentence information is received, the electronic apparatus 100 may obtain the second summary sentence information by restoring the converted word included in the first summary sentence information (S790).

In the above embodiment, it is described that when it is identified that a summary request for the first text information is transmitted to the external server 200, the second summary sentence information is not generated directly in the electronic apparatus 100, but the present disclosure is not limited thereto.

In other words, according to an embodiment, even if the first summary sentence information is received from the external server 200 by transmitting a summary request for the first text information to the external server 200, the electronic apparatus 100 may obtain the second summary sentence information through the steps of S740 and S750. In addition, the electronic apparatus 100 may compare the second summary sentence information in which the first summary sentence information received from the external server 200 is restored with the second summary sentence information generated in the electronic apparatus 100, and identify the second summary information with a better summary performance as the final second summary sentence information.

Figure 8:
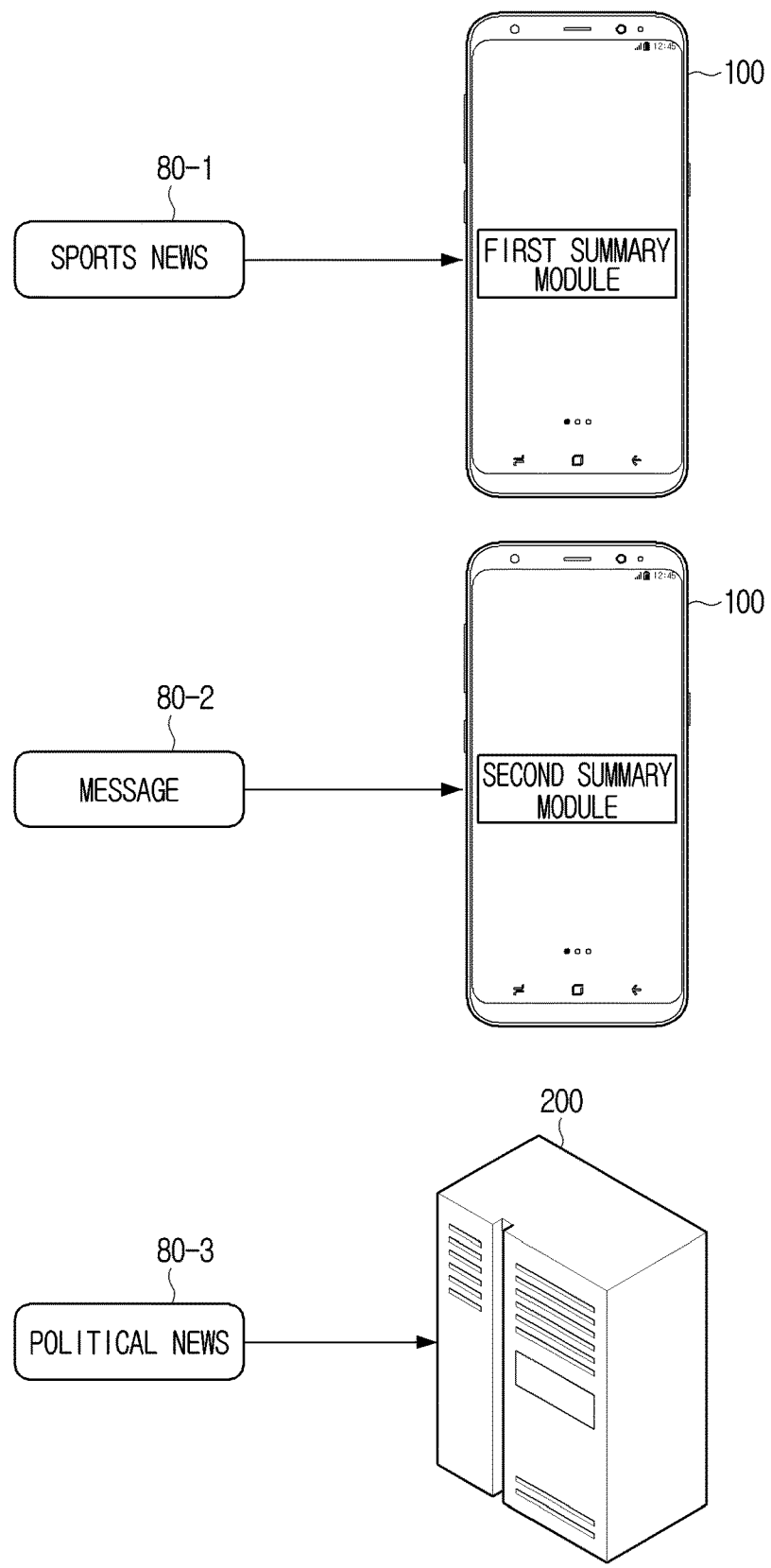
FIG. 8 is a diagram illustrating an example method of identifying a summary module depending on a type of first text information according to an embodiment.

FIG. 8 is a diagram illustrating an example method of identifying a summary module depending on a type of first text information according to an embodiment.

According to an embodiment, the electronic apparatus 100 may identify the type of the first text information. For example, the first text information may include text information 80-1 regarding a type of sports news, text information 80-2 regarding a type of messages, and text information 80-3 regarding a type of political news.

The electronic apparatus 100 may identify whether to transmit a summary request for the first text information to the server 200 based on the type of the first text information.

According to an embodiment, a first summary module for summarizing a type of sports news and a second summary module for summarizing a type of messages may be pre-stored in the electronic apparatus 100. In this case, the electronic apparatus 100 may identify that summarization of the text information 80-1 and the text information 80-2 is performed in the electronic apparatus 100, and may not transmit a summary request for the first text information to the external server 200. The electronic apparatus 100 may perform summarization regarding the text information by summarizing the text information 80-1 through the first summary module and perform summarization regarding the text information by summarizing the text information 80-2 through the second summary module.

According to an embodiment, if a summary module for summarizing a type of political news is not pre-stored in the electronic apparatus 100, the electronic apparatus 100 may transmit a summary request for the text information 80-3 to the external server 200. According to an embodiment, text information in which at least one word requiring security, included in the text information 80-3, is converted may be transmitted to the external server 200.

In addition, the electronic apparatus 100 may receive summary sentence information regarding the text information 80-3 from the external server 200.

In the above embodiment, it is described that the second summary module is a summary module for summarizing a type of messages, but it is not limited thereto. The second summary module may be a general summary module for summarizing all types. In other words, in the case of the text information 80-2 regarding a type of messages, it may be identified as a security level requiring a high level of security. In this case, the electronic apparatus 100 may not transmit the text information 80-2 to the external server 200, and perform summarization of the text information 80-2 through the second summary module which is a general summary module pre-stored in the electronic apparatus 100.

Figure 9:
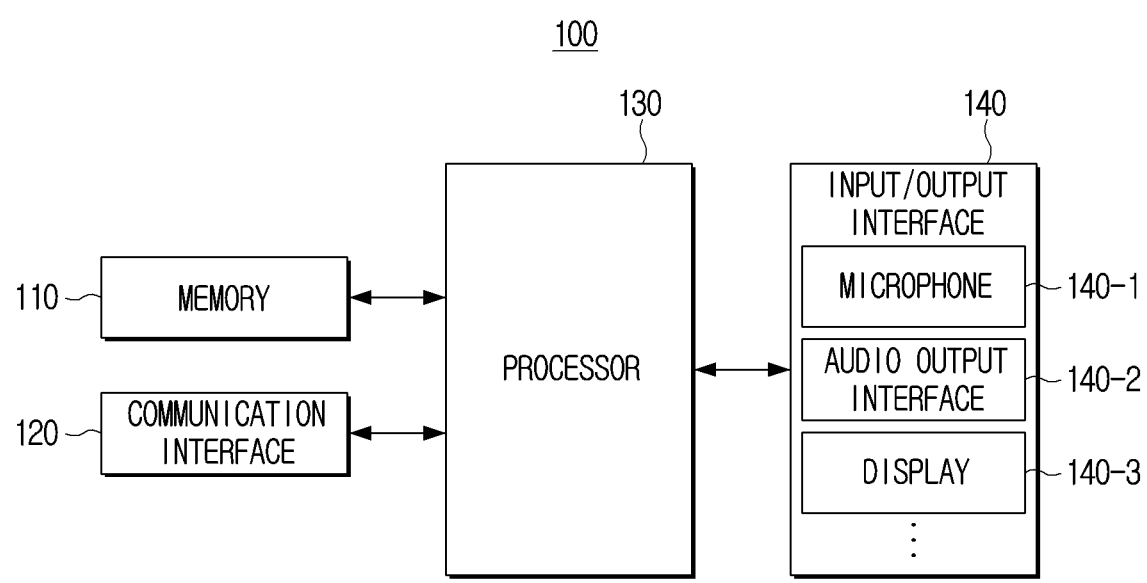
FIG. 9 is a block diagram illustrating an example configuration of an electronic apparatus according to an embodiment.

FIG. 9 is a block diagram illustrating an example configuration of an example electronic apparatus according to an embodiment.

As illustrated in FIG. 9, the electronic apparatus 100 may include the memory 110, the communication interface (e.g., including communication circuitry) 120, the processor (e.g., including processing circuitry) 130, and an input/output interface (e.g., including input/output circuitry) 140. As the memory 110, the communication interface 120 and the processor 130 illustrated in FIG. 9 have already described with reference to FIG. 1, overlapping description may not be repeated here.

The input/output interface 140 may include various input/output circuitry and may be configured to receive an input, e.g., a user input, for controlling the electronic apparatus 100 and provide a second summary sentence according to an embodiment to a user.

For example, a microphone 140-1 may receive a user voice for performing a specific operation. For example, if a user voice is input through the microphone 140-1, the processor 130 may identify the user voice using a Speech to Text (STT) module (not illustrated).

An audio output interface 140-2 may be configured to output various alarm sounds or voice messages as well as various audio data. For example, the audio output interface 140-2 may output operations or guidance messages regarding a voice uttered by a user as a voice message in the form of a natural language.

In addition, the audio output interface 140-2 according to an embodiment may output the second summary sentence information summarizing the first text information as a voice message in the form of a natural language.

The configuration for outputting an audio may be implemented as a speaker, but this is only an example. It can be implemented as an output terminal capable of outputting audio data.

A display 140-3 may display various information under the control of the processor 130. For example, the display 140-3 may display the second summary sentence summarizing the first text information. In addition, according to an embodiment, if a summary command regarding the first text information displayed on the display 140-3 is input, the processor 130 may control the display 140-3 to obtain the second summary sentence information regarding the first text information and display the second summary sentence on the display 140-3. According to an embodiment, the summary command regarding the first text information may be input in the form of a user voice through the microphone 140-2, or may be input in the form of a touch through the display 140-3. However, the present disclosure is not limited thereto, and the summary command may be input through various configurations capable of receiving a user input.

The display 140-3 may be implemented as various types of displays such as, for example, and without limitation, Liquid Crystal Display Panel (LCD), light emitting diode (LED), Organic Light Emitting Diodes (OLED), Liquid Crystal on Silicon (LCoS), Digital Light Processing (DLP), etc. In addition, a driving unit that can be implemented in the form of a-si TFT, low temperature poly silicon (LTPS) TFT, organic TFT (OTFT), etc., a backlight unit, etc. may also be included in the display 140-3.

In addition, the display 140-3 may be implemented as a touch screen in combination with a touch panel. However, this is only an example, and the display 140-3 may be implemented in various ways.

Figure 10:
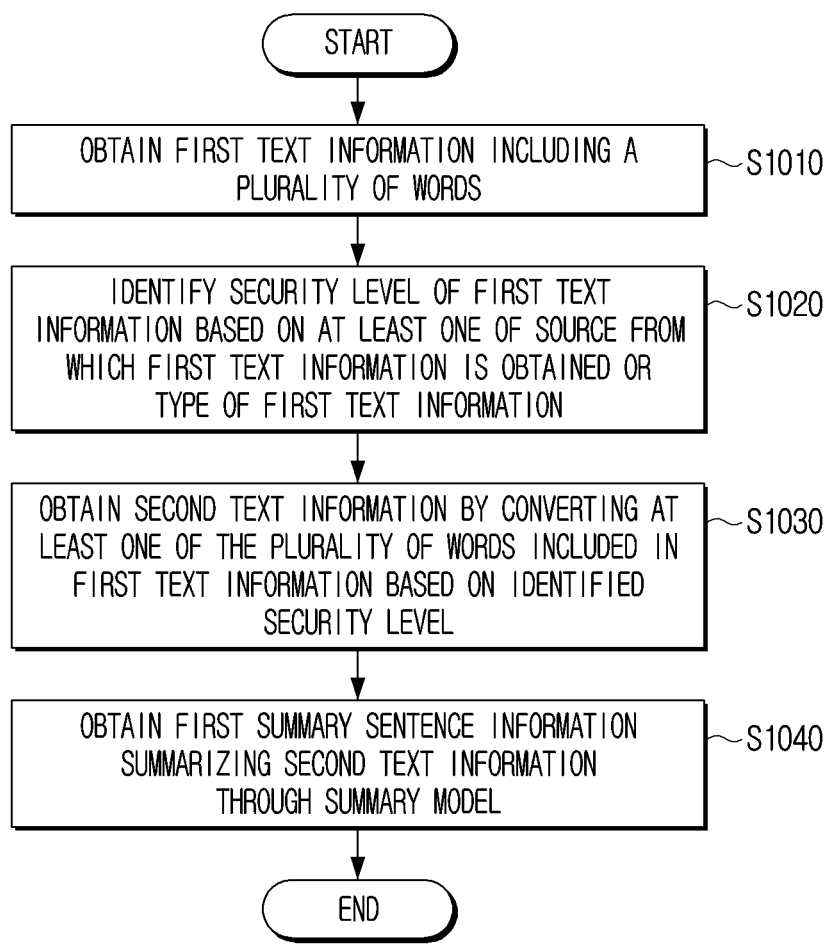
FIG. 10 is a flowchart illustrating an example method of controlling an electronic apparatus according to an embodiment.

FIG. 10 is a flowchart illustrating an example method of controlling an electronic apparatus according to an embodiment.

The electronic apparatus 100 may obtain first text information including a plurality of words (S1010). According to an embodiment, the first text information may include a sentence including a plurality of words, but is not limited thereto. The first text information may include a plurality of sentences. According to an embodiment, the electronic apparatus 100 may obtain the first text information through at least one application. However, the present disclosure is not limited thereto, and the electronic apparatus 100 may obtain the first text information from an eternal device or an external server.

Once the first text information is obtained, the electronic apparatus 100 may identify the security level of the first text information based on at least one of a source from which the first text information is obtained and a type of the first text information (S1020). The security level according to an embodiment may be a level for indicating the degree of security required for a word included in the first text information. For example, the electronic apparatus 100 may identify the security level of the first text information according to the type of the application from which the first text information is obtained.

The electronic apparatus 100 may obtain second text information by converting at least one of the plurality of words included in the first text information (S1030). According to an embodiment, the electronic apparatus 100 may identify at least one word requiring security from among the plurality of words included in the first text information, and obtain the second text information by converting the corresponding word based on at least one of a type or sensitivity of the identified at least one word. The electronic apparatus 100 may convert the identified at least one word by, for example, and without limitation, masking the identified word based on the identified type and sensitivity, replacing the identified word with another word, omitting the at least one word, etc.

The electronic apparatus 100 may obtain first summary sentence information summarizing the second text information through a summary module (S1040). According to an embodiment, the electronic apparatus 100 may transmit the second text information to the server 200 in which a summary module is stored, and receive the first summary sentence information from the server 200. However, the present disclosure is not limited thereto, and the electronic apparatus 100 may further include a summary module for summarizing the second text information and obtain the first summary sentence by summarizing the second text information through the corresponding summary module.

As described above, various example embodiments of the present disclosure have been described with reference to the accompanying drawings. However, it should be noted that the various example embodiments are not for limiting the scope of the disclosure to a specific embodiment, but they should be interpreted to include all modifications, equivalents and/or alternatives of the embodiments. In connection with the description of the drawings, similar reference numerals may be used for similar elements.

In the present disclosure, the terms "have", "may have", "comprise", or "may comprise" designate the presence of the corresponding features (e.g., numbers, functions, operations or components such as parts, etc.), but do not exclude the presence of additional features.

In the description, expressions such as "A or B", "at least one of A and/or B", or "one or more of A and/or B" may include all possible combinations of the items listed together. For example, "A or B", "at least one of A and/or B", or "one or more of A and/or B" may refer to the cases of (1) including at least one A, (2) including at least one B, or (3) including at least one A and at least one B.

Expressions "first", "second", or the like, used in the disclosure may refer to various components regardless of a sequence and/or importance of the components, may be used to distinguish one component from the other components, and do not limit the corresponding components. For example, the first user device and the second user device may indicate different user devices regardless of order or importance. For example, the first component may be referred to as the second component and similarly, the second component may be referred to as the first component without departing from the scope of rights described in the present disclosure.

In the present disclosure, terms such as 'a module', 'a unit', 'a part', etc. are used to refer to a component that performs at least one function or operation, and may be implemented by hardware or software or a combination of the hardware and the software. In addition, a plurality of 'modules', 'units', 'parts', etc. may be integrated into at least one module or chip to be implemented as at least one processor except for the case where each of them should be realized in a specific hardware.

The terms used in this disclosure are used to describe various example embodiments, and are not intended to limit the scope of other embodiments. Singular expressions may include plural expressions unless the context clearly indicates otherwise. Terms used herein, including technical or scientific terms, may have the same meaning as commonly understood by a person skilled in the art described in this document. Among the terms used in this document, terms defined in a general dictionary may be interpreted as having the same or similar meaning in the context of the related art, and should not be interpreted to have ideally or excessively formal meanings unless explicitly defined in this document. In some cases, even terms defined in this document should not be interpreted to exclude embodiments of this document.

The electronic apparatus according to the various embodiments of the present disclosure includes, for example, and without limitation, at least one of smart phone, tablet personal computer, mobile phone, video phone, AI speaker, e-book reader, desktop personal computer, laptop personal computer, netbook computer workstation, server, personal digital assistant, portable multimedia player, MP3 player, mobile medical device, camera, wearable device, or the like.

According to some embodiments, the electronic apparatus may include, for example, and without limitation, at least one of part of a furniture or building/structure, electronic board, electronic signature receiving device, projector, various measuring devices (e.g., water, electricity, gas, radio wave measuring device, etc.), or the like. In various embodiments, the electronic apparatus include a combination of one or more of the various devices described above. The electronic apparatus according to an embodiment may, for example, and without limitation, be a flexible electronic apparatus. In addition, the electronic apparatus according to an embodiment may include an electronic apparatus connected to external Internet through connection with network equipment such as AP, gateway, router, switch, etc. as well as the above-described devices, and may include a new electronic apparatus according to the development of technology.

The above-described various embodiments can be implemented as software, hardware or a combination thereof. According to a hardware implementation, embodiments described in the present disclosure can be implemented using at least one of Application Specific Integrated Circuits (ASICs), digital signal processors (DSPs), digital signal processing devices (DSPDs) programmable logic devices (PLDs), field programmable gate arrays (FPGAs), processors, controllers, micro-controllers, microprocessors, or electrical units for performing other functions. In particular, the above-described various embodiments can be implemented by the processor 130 of the electronic apparatus 100. According to a software implementation, embodiments such as procedures and functions described in this document may be implemented as separate software modules. Each of the software modules may perform one or more functions and operations described in this document.

The various embodiments of the disclosure may be implemented as software including instructions stored in machine-readable storage media, which can be read by machines (e.g.: computers). The machine refers to a device that can call instructions stored in a storage medium, and can operate according to the called instructions, and the device may include the electronic apparatus 100 according to the embodiments described in the disclosure When the instructions are executed by the processor, the processor may perform functions corresponding to the instructions by itself, or using other components under its control. An instruction may include a code made by a compiler or a code executable by an interpreter. For example, by executing the instructions stored in a storage medium by the processor, the controlling method of the above-described electronic apparatus 100 may be executed. For example, by executing the instructions stored in a storage medium by the processor of an apparatus (or an electronic apparatus), the steps of obtaining first text information including a plurality of words, identifying a security level of the first text information based on at least one of a source from which the first text information is obtained or a type of the first text information, obtaining second text information by converting at least one of the plurality of words included in the first text information based on the identified security level, and obtaining first summary sentence information summarizing the second text information through a summary module may be performed.

A storage medium that is readable by machines may be provided in the form of a non-transitory storage medium. A 'non-transitory' storage medium is a tangible device, and may not include a signal, and the term does not distinguish a case wherein data is stored semi-permanently in a storage medium and a case wherein data is stored temporarily.

According to an embodiment of the disclosure, the method according to the various embodiments described in the disclosure may be provided while being included in a computer program product. The computer program product is a product, and it can be traded between a seller and a buyer. The computer program product can be distributed in the form of a storage medium that is readable by machines (e.g., a compact disc read only memory (CD-ROM)), or distributed on-line through an application store (e.g., App Store Play Store™, App Store™). In the case of on-line distribution, at least a portion of the computer program product may be stored in a storage medium such as the server of the manufacturer, the server of the application store, or the memory of the relay server at least temporarily, or may be generated temporarily.

Each of the components according to the aforementioned various embodiments (e.g.: a module or a program) may include, for example, a singular object or a plurality of objects. In addition, among the aforementioned corresponding sub components, some sub components may be omitted, or other sub components may be further included in the various embodiments. Alternatively or additionally, some components (e.g.: a module or a program) may be integrated as an object, and perform the functions that were performed by each of the components before integration identically or in a similar manner Operations performed by a module, a program, or other components according to the various embodiments may be executed sequentially, in parallel, repetitively, or heuristically. Or, at least some of the operations may be executed in a different order, or omitted, or other operations may be added While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure including the appended claims.

What is claimed is:

1. An electronic apparatus comprising:
   a communication interface comprising communication circuitry;
   a memory including at least one instruction; and
   a processor connected to the communication interface and the memory, and configured to control the electronic apparatus,
   wherein the processor is configured to execute the at least one instruction to:
   obtain first text information including a plurality of words,
   identify a security level of the first text information based on at least one of a source from which the first text information is obtained or a type of the first text information,
   obtain second text information by converting at least one of the plurality of words included in the first text information based on the identified security level,
   obtain first summary sentence information summarizing the second text information through a summary module, and
   obtain second summary sentence information by restoring a second word to which a first word included in the first summary sentence information is converted,
   wherein the second summary sentence information includes the second word to which to the first word is restored, and
   wherein the second summary sentence information comprises a summary sentence information summarizing the first text information in which a word requiring security is not converted.

2. The apparatus as claimed in claim 1, wherein the processor is configured to: identify at least one word requiring security from among the plurality of words included in the first text information based on the security level, and convert the at least one word based on at least one of a type or sensitivity of the identified at least one word.

3. The apparatus as claimed in claim 2, wherein the processor is configured to obtain the second text information by masking at least one word included in the first text information requiring security based on the identified security level.

4. The apparatus as claimed in claim 2, wherein the processor is configured to obtain the second text information by replacing at least one word included in the first text information requiring security with another word or omitting at least one word based on the identified security level.

5. The apparatus as claimed in claim 1, wherein the first summary sentence information includes a second converted word obtained based on a first converted word included in the second text information, and wherein the processor is configured to obtain a word included in the second summary sentence information and corresponding to the first converted word by restoring the second converted word.

6. The apparatus as claimed in claim 1, wherein the processor is configured to restore at least one converted word included in the first summary sentence using the first text information and the second text information.

7. The apparatus as claimed in claim 1, wherein the processor is configured to control the electronic apparatus to: transmit the second text information to an external server in which the summary module is stored through the communication interface, and receive first summary sentence information from the external server through the communication interface.

8. The apparatus as claimed in claim 1, wherein the processor is configured to:

based on a summary module for summarizing the type of the first text information not being pre-stored in the electronic apparatus, control the communication interface to transmit a summary request for the first text information, and based on a summary module for summarizing the type of the first text information being pre-stored in the electronic apparatus, obtain first summary sentence information summarizing the second text information through the summary module.

9. The apparatus as claimed in claim 1, wherein a security level identification module, a text conversion module, a text restoration module, and a summary module are implemented as artificial intelligence modules, and wherein a first learning is performed for each module so that a difference between the second summary sentence information and correct answer summary sentence information regarding the first text information is reduced.

10. The apparatus as claimed in claim 9, wherein a second learning is performed for each module so that the difference between at least one word converted through the text conversion module in the first text information and the word before conversion is reduced.

11. The apparatus as claimed in claim 10, wherein a third learning is performed for each module is performed so that a number of words converted through the text conversion module in the first text information is reduced.

12. The apparatus as claimed in claim 11, wherein if the first text information is text information including personal information less than a threshold, a learning for each module is performed by reducing a weight for the third learning and by increasing weights for the first learning and the second learning.

13. The apparatus as claimed in claim 12, wherein if the first text information is text information including personal information greater than or equal to the threshold, the learning for each module is performed by increasing a weight for the third learning.

14. A method of controlling an electronic apparatus, comprising:

obtaining first text information including a plurality of words;

identifying a security level of the first text information based on at least one of a source from which the first text information is obtained or a type of the first text information, obtaining second text information by converting at least one of the plurality of words included in the first text information based on the identified security level, and obtaining first summary sentence information summarizing the second text information through a summary module, and obtaining second summary sentence information at least by restoring a converted word included in the first summary sentence information, wherein the second summary sentence information includes the second word to which to the first word is restored, and wherein the second summary sentence information comprises a summary sentence information summarizing the first text information in which a word requiring security is not converted.

15. The method as claimed in claim 14, wherein the obtaining second text information comprises:

identifying at least one word requiring security from among the plurality of words included in the first text information based on the security level; and converting the at least one word based on at least one of a type or sensitivity of the identified at least one word.

16. The method as claimed in claim 15, wherein the obtaining second text information comprises masking at least one word included in the first text information through a text conversion model based on the identified security level.

17. The method as claimed in claim 15, wherein the obtaining second text information comprises obtaining the second text information by replacing at least one word included in the first text information requiring security with another word or omitting at least one word based on the identified security level.

* * * * *